3,816,522
CATALYTIC OXIDATION OF CARBONYL COMPOUNDS
Theodore P. Goldstein, Yardley, Pa., assignor to Mobil Oil Corporation
No Drawing. Filed Oct. 5, 1971, Ser. No. 186,819
Int. Cl. C07c 63/02
U.S. Cl. 260—523 A    14 Claims

ABSTRACT OF THE DISCLOSURE

Carbonyl compounds, including aldehydes, may be oxidized under mild reaction conditions to the corresponding carboxy compound by carrying out the reaction in the presence of a thiazolium compound or cyanide ions as catalyst for the oxidation. The reaction mixtures produced by the method of this invention are of utility.

CROSS-REFERENCE TO RELATED APPLICATIONS

None.

BACKGROUND OF THE INVENTION

Field of the invention

This invention relates to a method of oxidizing carbonyl compounds and in particular it relates to the use of certain nitrogen-containing compounds to catalyze oxidation of carbonyl compounds.

Description of the prior art

Oxidation of carbonyl compounds, such as aldehydes, to the corresponding carboxy compounds usually requires the presence of metallic catalysts, such as vanadium, copper, chromium or cobalt salts, (U.S. 3,364,257, 3,408,392 and 3,415,877) or nitric acid (U.S. 3,280,182). Although air is a common oxidizing agent, stronger oxidizing agents, such as peroxides and potassium permanganate, have been used, e.g. sodium hypochlorite, to oxidize p-methylacetophenone (Feifer et al., Journal of Organic Chemistry, Volume 26, page 2567, 1961).

Cyanide ions and thiazolium compounds have been described as catalysts for the benzoin condensation (Gould, "Mechanism and Structure in Organic Chemistry," pages 396 to 397). p-Nitrobenzaldehyde has been reacted with cyanide to produce a cyanohydrin product which reduces o-dintrobenzene (Guilbault and Kramer, Journal of Analytical Chemistry, Volume 38, No. 7, pages 834–836, June 1966; see also authors' articles in Journal of Organic Chemistry, Volume 31, pages 1103 to 1106, April 1966 and, with Miller, Volume 32, pages 1163 to 1165, April 1967). However, no reference has been found relating to the use of thiazolium or cyanide ions as catalysts for oxidizing carbonyl compounds.

SUMMARY OF THE INVENTION

It has now been discovered that organic carbonyl compounds may be oxidized with a variety of oxidants by carrying out the reaction in the presence of a thiazolium compound or cyanide ion.

DESCRIPTION OF SPECIFIC EMBODIMENTS

Carbonyl compounds, having the structure

are oxidized with an oxidizing agent at atmospheric pressure and under moderate temperature in the presence of cyanide ions or thiazolium compounds, wherein R may be hydrogen, hydrocarbyl or hydrocarbyl derivatives containing nitrogen, oxygen, sulfur, halogen and phosphorous atoms. More specifically, R may be hydrogen, alkyl, alkenyl, cycloalkyl, cycloalkenyl, aryl, aralkyl and alkaryl; and derivatives thereof such as amino, nitro, hydroxy, alkyloxy, alkylcarbonyl or aryloxy, arylcarbonyl, carboxy, halo and heterocyclic groups and the like. R may contain from 1 to about 40 carbon atoms and preferably from 1 to 25. Although formaldehyde may be used, R is preferably an organic radical.

The carbonyl compounds of this invention include alkyl aldehydes, e.g. acetaldehyde, propionaldehyde, butyraldehyde, valeraldehyde, hexaldehyde, heptaldehyde, stearaldehyde, unsaturated aldehydes, e.g. acrolein and crotonaldehyde, cyclic and aromatic aldehydes, e.g. cyclohexylacetaldehyde and benzaldehyde, and derivatives thereof, acetoxybutyraldehyde, formylcyclopentane, chloral, formylsuccinic acid and their esters, glyceraldehyde, furfural, nitrobenzaldehyde, aminobenzaldehyde, carboxybenzaldehyde, glyoxal, phenylglyoxal and the like.

With regard to the catalyst used in this invention, cyanide ions or a thiazolinum compound permit the reaction to occur. In the absence of such a compound, essentially little or no conversion takes place between the oxidizing agent and the carbonyl compound.

The cyanide compounds which may be used in this invention are those in which the cyanide ion forms. These include hydrogen cyanide, ammonium cyanide, alkylammonium cyanides of from 1 to about 5 carbon atoms and metal cyanides, including alkali metal cyanides, alkaline earth metal cyanides and other metallic cyanides which are soluble in the reaction system, such as manganese, tin, silver and the like, also cadmium cyanide, cuprous and cupric cyanides, and zinc cyanide.

The second catalyst which may be used in the process of this invention are thiazolium compounds in which the 3- and 4-position members are further substituted by R' and R" as indicated in the following structure

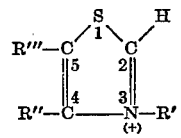

wherein R' and R" may each be hydrocarbyl or hydrocarbyl having functional groups or hydrocarbyl derivatives, the said functional groups or derivatives containing nitrogen, oxygen, halogen, sulfur or phosphorus atoms. Accordingly, R' and R" may be alkyl, aralkyl, alkaryl, alkenyl, cycloalkyl and cycloalkenyl or derivatives thereof containing hydroxy, carboxy, amino, amido, thio, phosphoro, sulfato, nitro nitroso halo and the like. The hydrocarbyl derivatives may also contain heterocyclic groups. To illustrate more specifically R' and R" may be, or may contain, for example, methyl, ethyl, propyl, butyl, hexyl, decyl hexadecyl, eicosly and the like, phenyl, tolyl, benzyl, nitrobenzyl, chlorobenzyl, methylbenzyl, naphthyl, naphthomethyl, naphthoethyl, cyclohexyl, cyclohexylmethyl, ethenyl, propenyl, hydroxyethyl, hydroxypropyl, aminoethyl, aminopropyl, furyl, furoyl, pyridyl, pyrrolidyl, pyrimidinyl, pyrroyl, and the like. R' and R" may each contain from 1 to about 50 carbon atoms and preferably from 1 to about 25 carbon atoms; R' at the 3-position nitrogen atom, is most preferably not a bulky group. R''', at the 5-position carbon atom, may be hydrogen or the same groups as those of R' and R".

Suitable thiazolium compounds include thiazolium halides, hydroxides, sulfates, phosphates, nitrates, oxalates, carboxylates and the like as the reagents. One class of preferred compounds in accordance with this invention are those in which the 4-position carbon is attached to an alkyl group having from 1 to about 10 carbon atoms and the 3-position nitrogen atom is attached to either an alkyl, aralkyl or a heterocyclic-alkyl group having from 1 to about 10 carbon atoms in the alkyl group. Of particular interest are N-benzyl-4-methylthiazolium halide and thiamine, or vitamin $B_1$, in which the 4-carbon atom is attached to a methyl group, the nitrogen atom to a methylamino-pyrimidylmethyl group and the 5-carbon atom to a hydroxyethyl group, and its phosphate, sulfate or halide salts.

In the reaction according to this invention, the carbonyl compound is dissolved in a suitable solvent and the solution maintained at a pH that ranges from slightly acidic to basic. Preferably the pH range is from about 6 to about 15, and most preferably from 7 to about 12. The solvents which may be used include polar liquids, such as water, benzene, toluene, carbon tetrachloride, dioxane, ether, dimethylformamide, dimethylsulfoxide, or any inert organic or inorganic liquid, preferably in which the carbonyl compound is soluble. Water is most preferred.

The catalyst is added to the liquid reaction mixture at a concentration of as low as $10^{-5}$ mole of catalyst per mole of carbonyl compound and preferably ranging from 0.01 to 5 moles of catalyst per mole of carbonyl compound. The liquid mixture is then treated with the oxidizing agent. Air, being the preferred agent, may be bubbled through the reaction mixture. Other suitable oxidizing agents, or oxidants, include dinitrobenzene, and oxidized forms of dyes, such as the viologenes, benzyl viologen and methyl viologen, crystal violet, methylene blue, and the like; and a quinone compound: quinones, such as benzoquinone and naphthoquinone, substituted quinones, having alkyl, aryl, alkoxy, hydroxy, halo, sulfonato, and the like as substituents, amino quinones, quinonimines; alkyl and aryl tetrazolium compounds, such as triphenyltetrazolium chloride.

Ordinarily, this reaction may be carried out at a sufficient temperature to obtain adequate contact of the reaction components. Room temperature has been found to be satisfactory. Heat may be applied although it is not critical to the carrying out of the invention. Temperatures from 20° to about 100° C. may be used, preferably up to 60° C. It has been found that without the presence of cyanide ions or the thiazolium compound as indicated previously, the oxidation occurs to a much lower extent, if at all, in this temperature range.

The process of this invention has been hitherto been described in both broad and narrow terms. To further illustrate the invention, the following working examples are presented. All percentages given therein, unless specifically designated, are deemed to be on a weight basis.

EXAMPLE 1

In a suitable reactor are mixed 1.5 grams (0.01 mole) of para-carboxybenzaldehyde in 70 ml. of water. The pH of the solution is adjusted to 13 by using sodium hydroxide, and 0.02 gram (0.0003 mole) of potassium cyanide is mixed into the reaction mixture. Air is bubbled up through the solution at a rate of about 600 cc. per minute. After about 5 hours, the percent conversion to terephthalic acid is 20 percent. After about 24 hours the conversion is about 50 percent. After 40 hours the conversion is about 70 percent.

When no cyanide is present in the reaction mixture, after 40 hours the percent conversion is about 5 percent. When 0.04 gram (0.0006 mole) of potassium cyanide is present (twice that of the above reaction), after about 5 hours about 40 percent conversion is achieved; after about 24 hours about over 70 percent conversion is achieved.

The reaction is followed by gas chromatographic analysis (by converting produced acid to the methyl ester and chromatographed). Infra-red analysis and vapor phase chromatography also confirm conversion to the phthalic acid.

EXAMPLE 2

In a suitable reactor 0.72 gram (0.01 mole) of methylglyoxal is mixed with 70 ml. of water. The pH of the mixture is raised to about 9 using sodium hydroxide, and 0.02 gram (0.0003 mole) of potassium cyanide is mixed into the reaction mixture. Air is bubbled through the said mixture at 600 cc. per minute for a period of 24 hours. The yield of pyruvic acid is about 50 percent. The same analytical procedures described in Example 1 are used in this example.

EXAMPLE 3

Following the reaction conditions of Example 2 and using the same mole ratios and amounts of reactants, phenylglyoxal is oxidized to benzoyl formic acid.

EXAMPLE 4

Into a suitable reactor are added 1.5 grams (0.01 mole) of para-nitrobenzaldehyde in 100 ml. of water and 2-methoxyethanol in an equal volume mixture. The pH is adjusted to 7 and 1.1 grams (0.005 mole) of N-benzyl-4-methylthiazolium chloride are added. To this reaction mixture are added 3.4 grams (0.02 mole) of ortho-dinitrobenzene. In two hours, the conversion to para-nitrobenzoic acid is essentially complete.

EXAMPLE 5

Into a suitable reactor are added 0.67 gram (0.005 mole) of phenylglyoxal dissolved in 100 ml. of water. The pH is adjusted to 8.5 and 0.34 gram (0.001 mole) of thiamine is added. Into the resulting mixture is added 3.2 grams (0.01 mole) of oxidized methylene blue. After a period of about 5 hours, the percent conversion to benzoylformic acid of about 75 percent is obtained and the reaction mixture is decolorized. When neither the thiazole compound nor cyanide ions are present in this reaction, the reaction mixture is not decolorized.

EXAMPLE 6

Methylglyoxal is oxidized in the same manner as in Example 5 except that N-benzyl-4-methylthiazolium chloride is the catalyst used and 4 grams (0.01 mole) of benzylviologen is added. After the reaction mixture is stirred for a period of about 3 hours, the conversion to pyruvic acid of 75 percent is obtained.

As indicated when these examples are repeated in the absence of cyanide ion or the thiazolium compound, little or no reaction conversion takes place.

The organic carboxylic acids, products of this invention, have many uses, not only as industrial chemicals but also as intermediates for producing other chemicals. For example, the acids specifically described herein may be used in the preparation of food substances, amino acids, and polymers for producing films and fibers. The final reaction mixtures of this invention containing the acid products and other components of the reaction are also understood to have similar utility as the pure acids.

The disclosure of the process of this invention and any minor modifications thereof which may be obvious to workers in the art are deemed to be within the scope of this invention, except as set forth in the following claims.

I claim:

1. A process for the oxidation of carbonyl compound having the structure

wherein R is selected from the group consisting of hydrogen, alkyl, alkylcarbonyl, aryl, arylcarbonyl, carboxyaryl, aralkyl and alkaryl having from 1 to about 40 carbon atoms and said groups containing amino, nitro and halo substituents, comprising oxidizing said compound using as the oxidizing agent a member selected from the group consisting of air, oxygen, dinitrobenzene, tetrazolium compound, a reducible dye and a quinone compound, in the presence of a catalyst selected from the group consisting of a cyanide ion provided to the reaction mixture by the addition of a compound selected from the group consisting of hydrogen cyanide, ammonium cyanide, alkylammonium cyanide, and a metal cyanide and a 3,4-substituted thiazolium compound having the structure

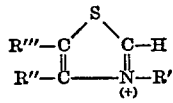

wherein R' and R" are individually selected from the group consisting of alkyl, aralkyl, alkaryl, alkenyl, cycloalkyl and said groups containing hydroxy, carboxy, amino, amido, thio, phosphoro, phosphato, sulfato nitro, nitroso, halo and heterocyclic substituents, said R' and R" having from 1 to about 50 carbon atoms, and R''' is selected from the group consisting of hydrogen and any of the above groups of R' and R".

2. The process of claim 1 wherein the thiazolium compound is thiamine.

3. The process of claim 1 wherein the thiazolium compound is N-benzyl-4-methylthiazolium chloride.

4. The process of claim 1 wherein R is selected from the group consisting of alkyl, alkylcarbonyl, phenyl, phenylcarbonyl, nitrophenyl, carboxyphenyl and alkylphenyl, having from 1 to about 25 carbon atoms.

5. The process of claim 1 wherein the carbonyl compound is selected from the group consisting of methylglyoxal, phenylglyoxal, nitrobenzaldehyde and carboxybenzaldehyde.

6. The process of claim 1 wherein the compound is an alkali metal cyanide.

7. The process of claim 6 wherein the alkali metal cyanide is potassium cyanide.

8. The process of claim 1 wherein the thiazolium compound is selected from the group consisting of a thiazolium halide, phosphate and sulfate salt.

9. The process of claim 1 wherein R''' is selected from the group consisting of hydrogen, alkyl and hydroxyalkyl of from 1 to 10 carbon atoms, R" is an alkyl group of from 1 to about 10 carbon atoms and R' is selected from the group consisting of alkyl, phenyl, phenylalkyl, and heterocyclic alkyl, the alkyl group having from 1 to 10 carbon atoms.

10. The process of claim 9 wherein the thiazolium compound is selected from the group consisting of N-benzyl-4-methylthiazolium, thiamine and the halide salt thereof.

11. The process of claim 1 wherein the reducible dye is selected from the group of oxidized forms of methylene blue, crystal violet, and organoviologen.

12. The process of claim 1 wherein the oxidizing agent is air.

13. The process of claim 1 wherein the oxidant is dinitrobenzene.

14. The process of claim 1 wherein the oxidant is the reducible dye of methylene blue.

References Cited
UNITED STATES PATENTS

| | | | |
|---|---|---|---|
| 1,919,730 | 7/1933 | Koenig et al. | 260—530 |
| 3,133,953 | 5/1964 | Mewa et al. | 260—530 |
| 3,364,257 | 1/1968 | Mounier | 260—530 |

LORRAINE A. WEINBERGER, Primary Examiner

P. J. KILLOS, Assistant Examiner

U.S. Cl. X.R.

260—347.3, 413, 491, 514 R, 518 R, 530 R, 530 N

PO-1050
(5/69)

UNITED STATES PATENT OFFICE
CERTIFICATE OF CORRECTION

Patent No. 3816522                    Dated  June 11, 1974

Inventor(s)  THEODORE P. GOLDSTEIN

It is certified that error appears in the above-identified patent and that said Letters Patent are hereby corrected as shown below:

Column 1, line 46, spelling of "dintrobenzene" should be --dinitrobenzene--.

Column 2, line 18, spelling of "thiazolinum" should be --thiazolium--

Column 2, line 48, insert comma after "nitro".

Column 2, line 48, insert comma after "nitroso".

Column 2, line 52, insert comma after "decyl".

Column 2, line 52, spelling of "eicosly" should be --eicosyl--.

Column 5, line 10, insert comma after "sulfato".

Signed and sealed this 1st day of October 1974.

(SEAL)
Attest:

McCOY M. GIBSON JR.
Attesting Officer

C. MARSHALL DANN
Commissioner of Patents